US008961840B1

(12) United States Patent
Hill et al.

(10) Patent No.: US 8,961,840 B1
(45) Date of Patent: Feb. 24, 2015

(54) METHOD FOR PRODUCING BULK CERAMIC COMPONENTS FROM AGGLOMERATIONS OF PARTIALLY CURED GELATINOUS POLYMER CERAMIC PRECURSOR RESIN DROPLETS

(71) Applicants: Arnold Hill, Orlando, FL (US); William Easter, Orlando, FL (US)

(72) Inventors: Arnold Hill, Orlando, FL (US); William Easter, Orlando, FL (US)

(73) Assignee: Dynamic Material Systems, LLC, Chuluota, FL (US)

( * ) Notice: Subject to any disclaimer, the term of this patent is extended or adjusted under 35 U.S.C. 154(b) by 165 days.

(21) Appl. No.: 13/775,594

(22) Filed: Feb. 25, 2013

Related U.S. Application Data

(60) Provisional application No. 61/606,007, filed on Mar. 2, 2012.

(51) Int. Cl.
*C04B 38/06* (2006.01)
*B29B 13/02* (2006.01)
*B05D 3/02* (2006.01)

(52) U.S. Cl.
CPC ............. *B29B 13/02* (2013.01); *B05D 3/0254* (2013.01)
USPC ...... 264/6; 264/42; 264/43; 264/44; 264/610; 264/620; 264/624; 264/629

(58) Field of Classification Search
None
See application file for complete search history.

(56) References Cited

U.S. PATENT DOCUMENTS

| | | | | |
|---|---|---|---|---|
| 6,680,013 | B1* | 1/2004 | Stein et al. | 264/44 |
| 8,119,057 | B2 | 2/2012 | Fei | |
| 8,293,048 | B2 | 10/2012 | Fei | |
| 2004/0048731 | A1* | 3/2004 | Kim et al. | 501/80 |
| 2012/0178618 | A1* | 7/2012 | Vinu et al. | 502/180 |
| 2014/0202125 | A1* | 7/2014 | Kobashi et al. | 55/523 |

OTHER PUBLICATIONS

Kleebe, et al., Decomposition-Crystallization of Polymer-Derived Si—C—N Ceramics, J. Am. Ceram. Soc., 1998, pp. 2971-2977, vol. 81, No. 11.
Colombo, et al., Polymer-Derived Ceramics: 40 Years of Research and Innovation in Advanced Ceramics, J. Am. Ceram. Soc., 2010, pp. 1805-1837, vol. 93, No. 7.
Ye, et al., Ceramic Microparticles and Capsules via Microfluidic Processing of a Preceramic Polymer, J. R. Soc. Interface, 2010, pp. 1-13.
Kleebe, et al., Decomposition-Crystallization of Polymer-Derived Si—C—N Ceramics, Journal of the American Society, 1998, pp. 2971-2977, vol. 81, abstract only.

* cited by examiner

*Primary Examiner* — Mary F Theisen
(74) *Attorney, Agent, or Firm* — Brian S. Steinberger; Law Offices of Brian S. Steinberger, P.A.

(57) ABSTRACT

Methods, processes, and systems for producing bulk ceramics from agglomerations of partially cured gelatinous polymer ceramic precursor resin droplets, without using sponge materials to form gas pathways in the polymer bodies. Ceramics can be formed in hours. Resin droplets can be produced with a sprayer where liquid polymer precursors, mixed with a curing agent, are sprayed forming droplets which are partially cured, collected, and compressed into shapes. Ceramic porosity can be varied, droplet particle sizes can be controlled by adjusting liquid and gas pressure, orifice size, during spraying. Partially cured droplets can be formed via an emulsion process and size controlled by emulsion liquid and surfactant selection parameters.

20 Claims, 3 Drawing Sheets

METHOD FOR PRODUCING BULK CERAMIC COMPONENTS FROM AGGLOMERATIONS OF PARTIALLY CURED GELATINOUS POLYMER CERAMIC PRECURSOR RESIN DROPLETS

CROSS REFERENCE TO RELATED APPLICATIONS

This invention claims the benefit of priority to U.S. Provisional Application Ser. No. 61/606,007 filed Mar. 2, 2012, the entire disclosure which is incorporated herein by specific reference thereto.

FIELD OF INVENTION

This invention relates to bulk ceramic components, and in particular to methods, processes, and systems for producing bulk ceramic components from agglomerations of partially cured gelatinous polymer ceramic precursor resin droplets and methods of use thereof.

BACKGROUND AND PRIOR ART

There are several processes to manufacture bulk ceramic components from different ceramic materials. The processes have in common that the ceramic material can be made into shapes with thick cross sections, which is opposed to thin film ceramics that are sprayed onto a substrate and then fired into a ceramic coating.

A majority of ceramic materials are made by mixing powdered ceramic materials with various liquids to create a slurry that can be injected or poured into a mold and then dried like plaster or concrete. The dried liquid acts as a binder that temporarily holds the ceramic powder particles in place and together. The dried, molded shapes are then placed in a furnace at high temperature, the dried liquid binder is burned out, and the ceramic powder particles begin to fuse together in a solid-state diffusion process.

The particles do not melt but are essentially "welded" together wherever they make contact with each other. Since the particles do not melt, there is space between them when the sintering process is complete. This space gives rise to a final product that is porous. The amount and size of the pores depend on the size of the ceramic particles.

Another route to obtaining ceramic material does not involve ceramic powders. This route involves liquid polymer resins that are cured to a solid and then fired in a furnace where the polymer material is converted through chemical transformations into a ceramic material. This class of ceramic is known as Polymer Derived Ceramics (PDC's).

The problem with PDC's is that as they convert to a ceramic under high temperature, they go through extensive shrinking and there is a substantial mass loss that is manifested in the form of gas evolution. Typically, if the cross section of the cured polymer is too large the gas generated inside the solid during the ceramic transformation causes a pressure build up that will crack the polymer body and result in a ceramic part with multiple cracks. To avoid the formation of cracks during the ceramic transformation the evolving gas needs to diffuse through the solid polymer phase and out to the surface. The longer the pathway leading to the surface the more diffusion resistance there is and the greater the internal backpressure. Therefore, there is a maximum diffusion length that can be tolerated in a pre-ceramic polymer shape. Because of this, PDC's were typically used for thin film coatings and micro-scale component applications.

The inventor was a co-inventor on U.S. patent application Ser. No. 13/372,297, now U.S. Pat. No. 8,119,057 which issued Feb. 21, 2012, which is incorporated by reference. The patent covered the method for synthesizing bulk ceramics and structures from polymeric ceramic precursors, and required the use of open cell material to form ceramic structures, where the liquid ceramic precursors were poured into a plastic sponge material and then solidified. The resulting solid polymer block with the plastic sponge inside could then be machined into any shape then placed into a furnace and converted to ceramic. The key here was that the sponge would melt and or burn out at a low temperature and leave a connected network of internal passageways that would allow the gases to escape as the polymer converted to a ceramic. As long as the internal gasses did not have to diffuse through the solid parts more than the critical distance before encountering one of the internal open passageways, the internal pressure would not get high enough to cause cracks. Currently, this is the only method known for bulk ceramic parts to be made with these polymer derived ceramics.

However, there are drawbacks to this method. The critical diffusion length of these polymer precursors is fairly small, about 50 microns or less and therefore a sponge material has to be chosen that has pores of 50 microns or less. There are not many sources of such materials. Another requirement of the sponge material is that it must decompose at a temperature lower than the temperature at which the polymer precursors start to convert to ceramic and produce gas. This temperature is quite low, about 300 C and there are not many sponge materials that have the pore structure and thermal decomposition properties required for this ceramic producing process. Another major drawback of this method is that it takes a long time to burn out this sponge material. If the part has thick cross sections it can take days or even weeks to completely burn out the sponge material before the temperature can be increase into the ceramic production range.

Thus, the need exists for solutions to the above problems with the prior art.

SUMMARY OF THE INVENTION

A primary objective of the present invention is to provide methods, processes, and systems for producing bulk ceramic components from agglomerations of partially cured gelatinous polymer ceramic precursor resin droplets.

A secondary objective of the present invention is to provide methods, processes, and systems for producing unique morphologies in bulk ceramic components.

A third objective of the present invention is to provide methods, processes, and systems for producing bulk ceramic components without using sponge materials to produce gas pathways in the polymer bodies.

A fourth objective of the present invention is to provide methods, processes, and systems for producing bulk ceramic components in hours instead of days and weeks.

A fifth objective of the present invention is to provide methods, processes, and systems for producing bulk ceramic components with a sprayer where liquid polymer precursors, mixed with a curing agent, are sprayed to form droplets which are partially cured, collected, and compressed into a shape form.

A sixth objective of the present invention is to provide methods, processes, and systems for producing bulk ceramic components where ceramic porosity can be varied from 25%-98%.

A seventh objective of the present invention is to provide methods, processes, and systems for producing bulk ceramic components with a spraying process, where droplet size of particles can be controlled by adjusting liquid pressure and gas pressure and orifice size as well as other parameters during the spraying process.

An eighth objective of the present invention is to provide methods, processes, and systems for producing bulk ceramic components with a spraying process using liquid droplets, where percentage of full cure of the liquid droplets can be controlled by the curing agent used, the curing temperature, and the time at that temperature.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
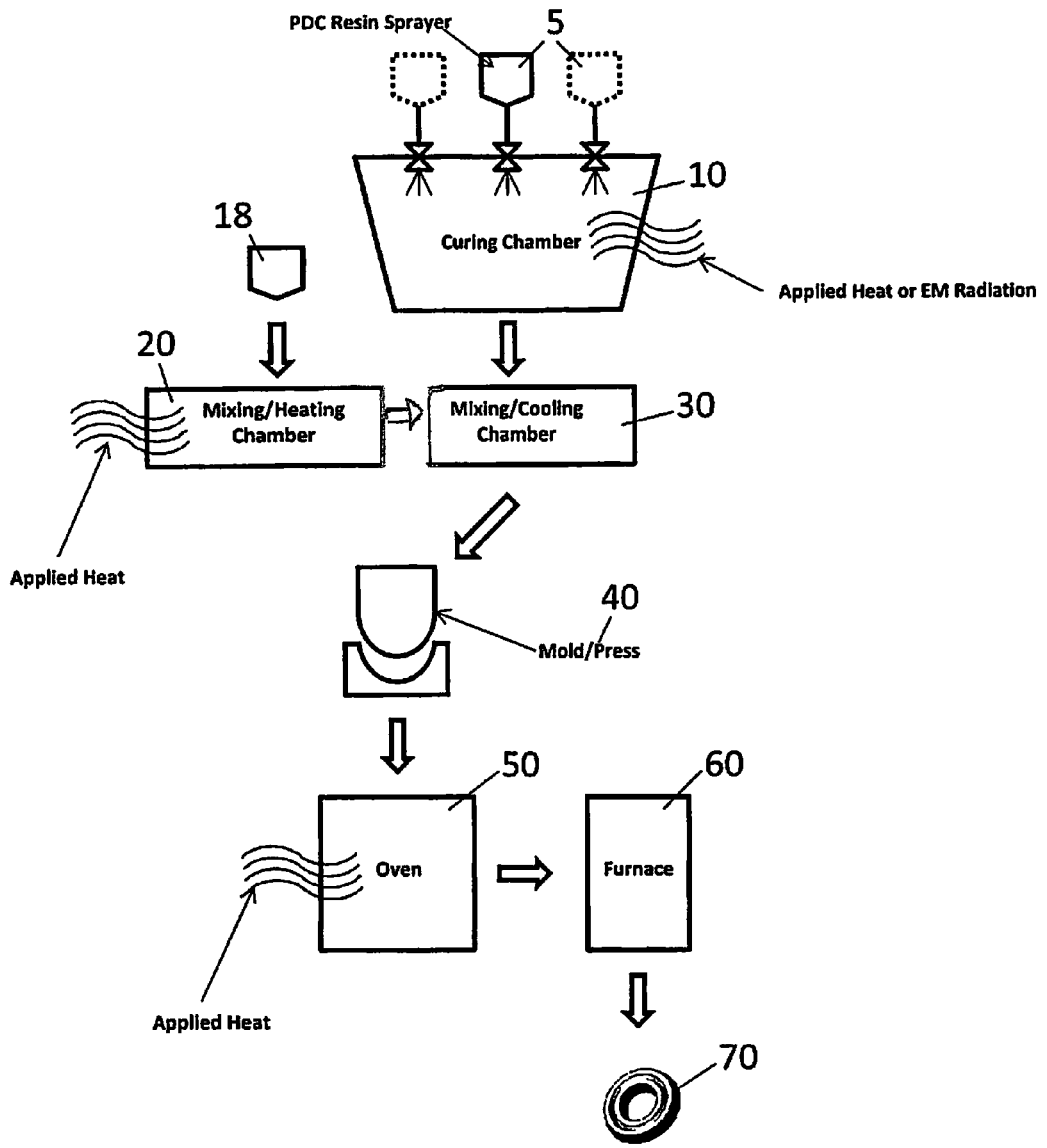
FIG. 1 is a flowchart showing the steps of using resin to form ceramic components.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

This new invention disposes of the sponge material completely and uses an entirely different method to produce the necessary gas pathways in the polymer body. Without the need to burn out a sponge material, ceramic parts of very large cross section can be produced in a matter of hours instead of days or weeks.

This new method of making pre-ceramic bulk parts with the required gas pathways uses a spraying technique where the liquid polymer precursors, which have been mixed with a curing agent, are sprayed either hydraulically or with gas assist to form droplets which are then partially cured and then collected, while still sticky or tacky, and then compressed into a mold or put through some other shape producing step.

It is important that the droplets not be 100% cured because they will not be able to form chemical bonds to each other which means they will not convert to a single continuous ceramic body. Instead each droplet would convert to a small droplet sized ceramic granule and the agglomeration would fall apart. The amount of compression has to be controlled so as not to squeeze all of the air out which would mean the gas path ways have been squeezed shut, which will lead to pressure build up, and part failure during firing.

In a paper published in "The Journal of the American Ceramics Society" by Hans-Joachim Kleebe ("Decomposition-Crystallization of Polymer-Derived Si—C—N Ceramics) J. Am. Ceram. Soc., 81 [11} 2971-77 (1998)) Kleebe describes a process where a sample of a polymer ceramic precursor was cured to a solid then crushed into a powder. Then more liquid precursor was mixed in to form a slurry which was then pressed into disks.

The resulting ceramic has some residual porosity due to trapped air and from shrinkage of the liquid as it cures to a solid. The pores however are non-uniform in size or spacing. Because a liquid was mixed with a powder, there was essentially no uniform network of gas pathways formed and therefore ceramic components with cross sections larger then 1 mm would not be possible.

The partially cured particles in the method proposed here are semi solid with a tacky surface. The spherical semi solid droplets hold their shape and thus maintain open pathways between them when they are in contact. By applying pressure to a collection of these semi solid spheres, the size of the gas pathways can be reduced to any desired level as long as they are not reduced to zero by over compression of the spheres.

Because the spheres are only partially cured and they are still sticky, the collections of spheres will hold together and can be molded like clay into any shape or they can be pressed into a mold. By varying the amount of compression in different areas of a part made in this way one can produce final ceramic parts with density that varies in a controllable way from one end of the part to the other.

Additionally, if a non-porous, fully dense surface is desired, the space between the semi solid spheres (beads) on and near the surface can be closed off by applying extra beads and/or applying localized mechanical pressure such that the surface beads are smeared, spackled or otherwise forced into the open pores of the surface being sealed.

Once the green body is cured and pyrolyzed the resulting bulk ceramic component will have a fully dense, non-porous surface suitable for polishing, metalizing or any number of additional surface treatments.

Because the spheres are only partially cured, the molded part can then be placed in an oven to complete the cure. After full curing the individual spheres are chemically bonded together and when fired will produce a single continuous ceramic part where the previous individual spheres are indistinguishable.

Advantages of making ceramic components with this method are: Ceramic porosity can be varied from 2% to 98%.

By adjusting liquid pressure and gas pressure and orifice size as well as other parameters during spraying, the droplet size can be controlled.

The percentage of full cure of the liquid droplets can be controlled by the curing agent used, the curing temperature, and the time at that temperature.

In one embodiment of the invention described in reference to FIG. 1, the liquid polymer ceramic precursor resins can be sprayed into a curing chamber of hot gas (air, nitrogen, argon, and the like) where the gas temperature is adjustable and the droplets would descend under gravity through the chamber which can be varied in height to control the time spent by the droplets in the hot zone which controls the amount of cure.

The partially cured spherical droplets would then fall into a funnel and collected.

An alternative to hot gas cure, with the appropriate curing agent, the curing chamber could be flooded with radiation (IR (infra red), UV (ultra violet), Microwave, and the like).

Yet another way to partially cure and collect the droplets would be to spray them into a hot, non-reactive, immiscible, liquid bath. This would form an emulsion to which a surfactant may be added to stabilize the emulsion while the liquid droplets cure. The emulsion could also be formed by pouring the liquid resin into the hot curing liquid then mixing with a high shear method to produce small droplets of resin in the emulsion. The droplets would then be scooped out and the excess liquid removed by squeezing or spinning before the final cure. The amount of initial cure can vary from >0-<100%.

Another major advantage of this process is that multiple different ceramic precursors can be co-sprayed in different ratios to produce a final composite ceramic body that would be made up of multiple different ceramics bonded together in a uniformly distributed pattern.

If desired the pre-ceramic resins could be co-sprayed with an inert filler that would burn out during firing. This would allow the spheres to be highly compacted without completely closing up the space between them. If desired the inert filler could be a metal powder where the metal would melt/sinter together and form a metal ceramic composite that could be made quickly and easily and with very uniform properties.

FIG. 1 is a flowchart showing the steps of using resin to form ceramic components. One or more Polymer Derived Ceramics (PDC's) resins 5 can be sprayed into a curing chamber 10. There are commercially available resins that are precursors to SiC, SiOC, SiCN and Si3N4 ceramics among others.

PDC resins can include but are not limited to Polysiloxanes, polysilazanes, polyborosiloxanes, polycarbosiloxanes, polyborosilanes and polycarbosilanes.

Varying spray parameters can allow for the size and quantity of the droplets to be controlled.

Spray parameters include but are not limited to controlling the physical properties of the resin such as viscosity and surface tension and controlling external spray parameters such as resin temperature and pressure and selection of spray nozzle geometry. For example by increasing the pressure and reducing the diameter of the spray nozzle will lead to smaller diameter droplets. Conversely increasing the diameter of the spray nozzle leads to larger diameter droplets. An increase in spray pressure typically leads to higher volume production of droplets as well. Similarly, increasing resin temperature and or reducing viscosity or surface tension will lead to smaller droplet formation.

The size of the droplets can include but are not limited to a range of approximately 1 micron in size to approximately 300 microns in size. Volume quantities can be controlled by spray parameters and number of spray nozzles and can range from a few milliliters per minute to multiple liters per second.

The curing chamber 10 can contain heated gas or applied heat or can be flooded with electromagnetic radiation (UV, microwave, and the like) to cure the gel droplets to the desired level.

The heated gas can include but is not limited to air, nitrogen, argon etc. heated to temperature of approximately 25 C to approximately 500 C degrees.

Electromagnetic wavelength can include but is not limited to infrared, ultraviolet or microwaves. The cure time can be milliseconds to minutes depending on droplet size, radiation intensity and flight time.

Optionally, the liquid PDC resins 15 can be mixed with surfactants and an inert liquid to form an emulsion of PDC resin droplets.

Surfactants can include but are not limited to PEG-12 Dimethicone, Glyceryl laurate, Polyethoxylated tallow amine, and the like.

Inert liquid can include but is not limited to Water, ethylene glycol, propylene glycol, glycerin, and the like.

The emulsion can then be heated in a mixing/heating chamber 20 to partially cure the resin droplets to the desired level.

The type of mixing chamber can include but is not limited to a stirred vat for batch production or flowing stream for continuous production.

The heating temperature can be approximately 25 C to approximately 400 C depending on emulsion fluid and time of heating can be seconds to minutes depending on quantity and type of crosslinking agent.

Heated liquid stirring bath can produce emulsions of PDC liquid resins. Adjusting stirring speeds, liquids in the bath and surfactants used allows the size and quantity of gelled droplets to be controlled. Adjusting time in and temperature of the liquid bath allows control over the percentage of cure of the gel droplets.

Stirring of the bath can produce a shear in the liquid which in turn breaks up the liquid resin droplets into smaller units. Ultrasonic energy can also be employed to agitate the bath. The use of ultrasonic emulsification can produce liquid droplets that are <1 micron in size. As the size of the droplets decreases the amount of surface area of the liquid resin goes up. This allows the resin to be cured at a faster rate. Increasing the bath temperature also increases the cure rate of the resin. By adjusting these parameters cure times can range from seconds to hours.

The partially cured gel droplets can be collected in a dry pan or cooling bath 30. Once the gel droplets are cured to the desired and selected level they are cooled which stops the curing process. They can be cooled by screening them out of the heated emulsion bath and placed in a cooling bath or spread onto cool surface.

The collected partially cured gel droplets can be pressed into a mold 40 which may or may not be heated to complete the cure of the gel droplets. The amount of compression can be varied which allows control over the porosity and density of the resulting green body.

Typically the cure can be completed in minutes to hours by raising the mold temperature up to the cure temperature of the beads which depends on the curing agent used.

Depending on the desired final density of the ceramic component being fabricated, the beads may be compressed to an apparent density of 25%-98%

Additionally, if a non-porous, fully dense surface is desired, the space between the semi solid spheres (beads) on and near the surface can be closed off by applying extra beads and/or applying localized mechanical pressure such that the surface beads are smeared, spackled or otherwise forced into the open pores of the surface being sealed.

Once the green body is cured and pyrolyzed the resulting bulk ceramic component will have a fully dense, non-porous surface suitable for polishing, metalizing or any number of additional surface treatments.

An oven can be used that can be computer controlled. Such an oven can include but is not limited to a convection heated oven, microwave oven or an oven using a combination of heat and electromagnetic radiation. Oven cure time can range from minutes to hours depending on cure agent used and cross sectional thickness of parts.

The processed green bodies can be fired in a furnace 60 to produce final ceramic components 70. The furnace can be an inert atmosphere furnace that is computer controlled and capable of temperatures in the approximately 800 C top approximately 1200 C range. The furnace can be off the shelf retort type furnaces or custom built. Typical pryolysis schedules involve computer controlled ramp and soak functions that can take the temperature from room temperature up to approximately 1000 C to approximately 1200 C over several hours.

The resulting ceramic components can range in size from <1 mm to several cm's and in theory is only limited by the size of the furnace. Gas pathways can make up from approximately 2% to approximately 98% of the volume and can range in size from approximately 1 to approximately 50 microns.

The term "approximately" can be +/−10% of the amount referenced. Additionally, preferred amounts and ranges can include the amounts and ranges referenced without the prefix of being approximately.

Additionally, if a bulk ceramic component with complex internal features is desired such as a network of plumbing pathways for coolant flow, and the like, the plumbing network could be fabricated out of a sacrificial material that would decompose and be removed from the bulk part during pyrolyzing.

Figure 2:
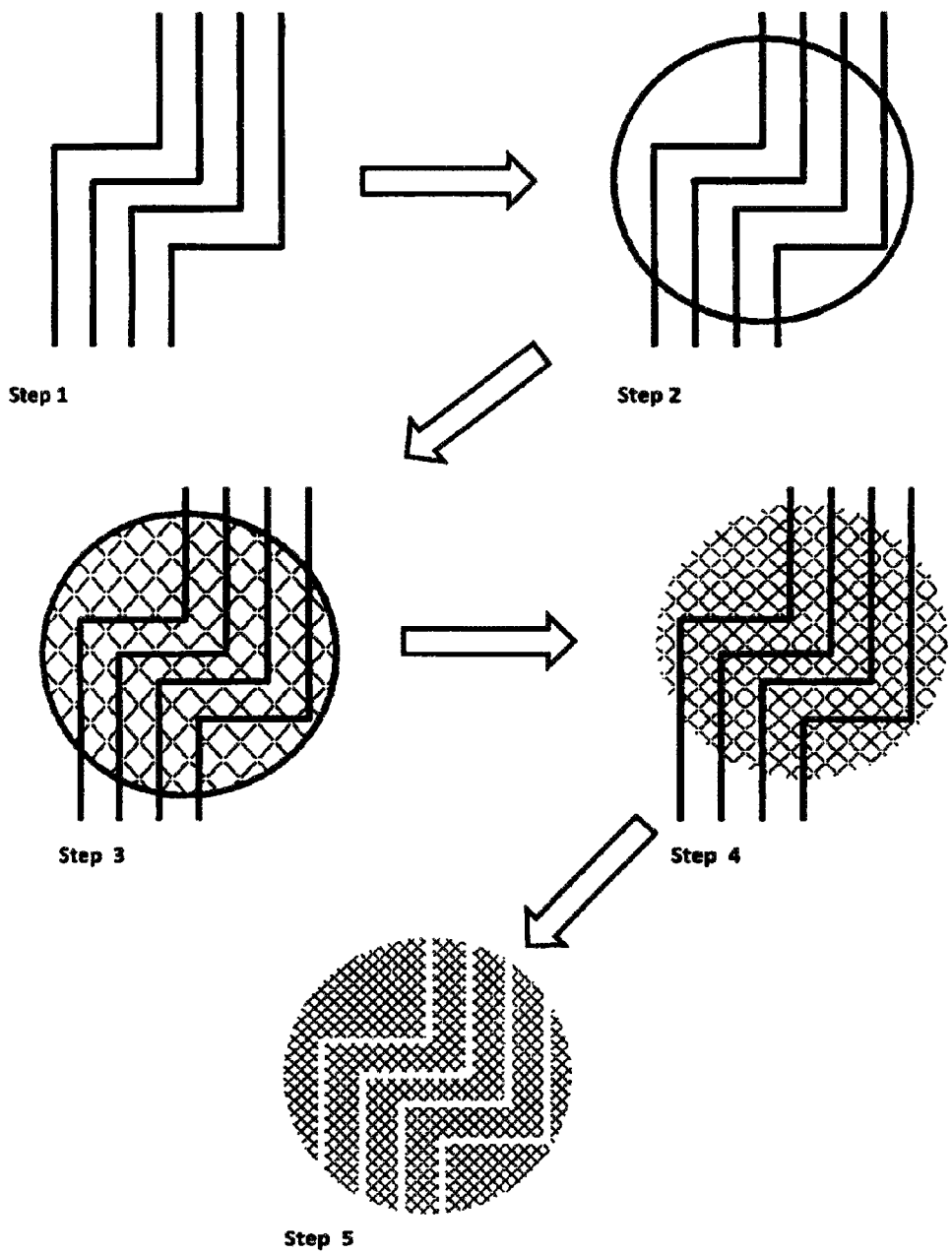
FIG. 2 shows the steps of creating plumbing with bulk ceramic components.

FIG. 2 shows the steps of creating plumbing with bulk ceramic components. The sacrificial material, in this example, could be polymer tubing or rods that would be connected together in the desired pattern and anchored to the mold so as not to move while the mold is being filled. The sacrificial material would be made to penetrate the surface of the molded part in at least one location so as to provide a gas escape pathway for the sacrificial material as it decomposes.

Step 1 is where the plumbing network is formed from sacrificial tube shaped material. Step 2 is where the plumbing network is placed in a mold.

After the plumbing network (as in this example) is created and placed into a suitable mold, the remaining space in the mold would be filled with the partially cured gelatinous beads as shown in Step 3.

After the application of suitable compression and/or vibration to the mold in order to fully encase the plumbing network molding features. The mold can be placed in an oven to complete the cure with a resulting green body is formed inside the mold with the sacrificial plumbing network embedded inside.

Once the molded part is fully cured, the green body would be removed from the mold and placed in a furnace for pyrolyzation in Step 5.

Upon pyrolyzation, the sacrificial plumbing network will have burned out leaving macroscopic passage ways (or any other internal feature desired) in the resulting bulk ceramic component. The Green body is placed in a furnace where the sacrificial plumbing network is burned off and the green body is converted to ceramic.

Figure 3:
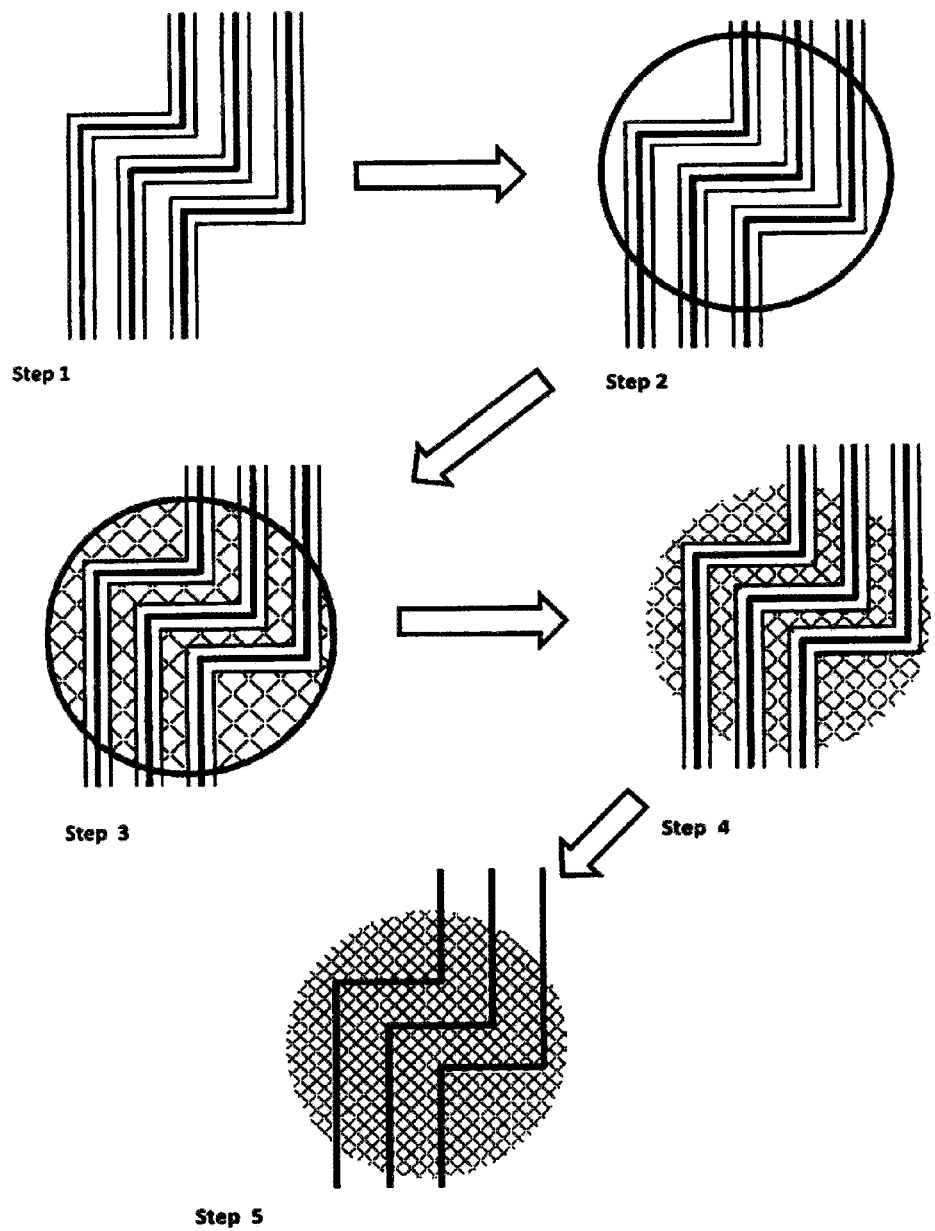
FIG. 3 shows the steps for creating conductor networks with bulk ceramic components.

FIG. 3 shows the steps for creating conductor networks with bulk ceramic components. As an additional example, if instead of a network of plumbing for fluid flow, a network of electrical conductors can be fabricated. One technique would be to form a network in the same manner as the fluid plumbing network, then, after pyrolyzing to a ceramic, the plumbing network could be filled with a molten metal conductor, that upon solidifying would constitute an electrical conducting network. Steps 1, 2, 3, 4 and 5 shown in FIG. 3 shows steps similar to those described in FIG. 2.

Another technique to form an electrical conducting network would be to fabricate the network from insulated metallic conductors in a similar manner to the plumbing network, then the conducting network would be placed into a suitable mold, the remaining space in the mold would be filled with the partially cured beads.

After the application of suitable compression and/or vibration to the mold in order to fully encase the conducting network molding features, the green body would be heated to complete the cure. During pyrolyzing the insulation around the conductors would burn out thus creating room for the pyrolyzing beads to shrink around and capture the conductors.

The insulation material and thickness would be chosen such that it would decompose at a low temperature and provide the proper clearance between the final ceramic body and the conductors. The conductor material would be chosen such that it would be unaffected by the pyrolyzation temperatures.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of making pre-ceramic bulk parts with gas pathways, comprising the steps of:
    mixing liquid polymer precursors with a curing agent to form a mixture of liquid polymer ceramic precursor resins;
    spraying the mixture into droplets;
    partially curing the droplets into a sticky and tacky state of particles;
    collecting the partially cured particles; and
    molding the collected particles into a shaped pre-ceramic bulk part having gas pathways therethrough.

2. The method of claim 1, wherein the particles are semi solid partially cured spheres that form gas pathways between them when they are pressed together.

3. The method of claim 2, wherein the molding step includes the step of:
    applying pressure to a collection of semi solid partially cured sphere particles, wherein the size of the gas pathways are capable to be reduced to a selected level as long as the particles are not compressed to the point where the space between them is reduced to zero.

4. The method of claim 1, further comprising the step of:
    curing the molded collected particles with hot gas to produce a single continuous polymeric part where the particles are indistinguishable.

5. The method of claim 1, further comprising the step of:
    curing the molded collected particles with radiation to produce a single continuous polymeric part where the particles are indistinguishable.

6. The method of claim 1, further comprising the step of:
    producing the particles in a hot, non-reactive, immiscible, liquid bath via an emulsion process.

7. The method of claim 1, further comprising the step of:
    co-spraying the mixture of liquid polymer ceramic precursor resins with an inert filler that would burn out after curing the mixture.

8. The method of claim 1, wherein the collecting step includes the step of:
    collecting the partially cured droplets in one of a dry pan or a cooling bath.

9. The method of claim 1, further comprising the steps of:
    creating a non-porous, fully dense surface on one or more of resulting green body surfaces, by closing off the space between semi solid spheres (beads) on and near the surface by applying extra beads and/or applying localized mechanical pressure such that the surface beads are smeared, spackled or otherwise forced into the open pores of the surface being sealed; and
    curing and pyrolizing the green body into a bulk ceramic component that has a fully dense, non-porous surface; and
    treating the fully dense and non-porous surface of the bulk ceramic component, wherein the step of treating is selected from one of polishing, metalizing or an additional surface treatments.

10. The method of claim 1, further comprising the step of:
varying ceramic porosity of the bulk part to be between approximately 2% to approximately 98%.

11. A method for producing bulk ceramic components without using sponge materials to produce gas pathways in polymer bodies, comprising the steps of:
mixing PDC (Polymer Derived Ceramics) resins in a chamber to form partially cured gel droplets;
compressing the partially cured gel droplets into a resulting body;
coating the resulting body with a PDC resin;
heating the PDC resin coated resulting body into a final state body; and
firing the final state body in a furnace to produce a ceramic component having gas pathways there through.

12. The method of claim 11, wherein the mixing step includes the step of:
mixing liquid PDC resins with surfactants and an inert liquid to form an emulsion of PDC resin droplets; and
heating the emulsion to form the partially cured gel droplets.

13. The method of claim 11, wherein the mixing step includes the steps of:
spraying PDC resin into a curing chamber to form PDC resin droplets;
curing the PDC resin droplets into the partially cured gel droplets.

14. The method of claim 11, further comprising the step of:
varying ceramic porosity of the ceramic component to be between approximately 2% to approximately 98%.

15. A method of converting plumbing networks into bulk ceramic components, comprising the steps of:
connecting together polymer tubing or polymer rods into a plumbing network;
placing the plumbing network into a mold;
packing the mold with partially cured gelatinous beads;
curing the gelatinous beads in the mold to form a resultant solid green body inside the mold with the sacrificial plumbing network embedded inside;
removing the resultant solid green body from the mold and
burning out the sacrificial plumbing network by pyrolyzation, wherein the sacrificial plumbing network will have burned out leaving macroscopic passage ways in a resulting bulk ceramic component whereas the passageways provide a gas escape pathway for the sacrificial material as it decomposes.

16. The method of claim 15, wherein the step of curing includes the step of:
placing the mold with the partially cured gelatinous beads in an oven; and
forming a solid green body from the mold in an oven.

17. The method of claim 15, wherein the step of burning out includes the step of: placing the resultant green body with the sacrificial plumbing network embedded inside in a furnace.

18. A method of converting conductor networks into bulk ceramic components, comprising the steps of:
forming a conductor network from conductive material having a sacrificial layer of insulation wrapped around the conductive material;
placing the conductor network into a mold;
packing the mold with partially cured gelatinous beads;
curing the gelatinous beads in the mold to form a resultant solid green body inside the mold with the conductor network embedded inside;
removing the resultant solid green body from the mold; and
burning out the sacrificial insulation on the conductor network by pyrolyzation, wherein a sacrificial plumbing network will have burned out leaving macroscopic passage ways; and
forming a resulting bulk ceramic component whereas the passageways provide a gas escape pathway for the sacrificial material as it decomposes and the resulting ceramic component shrinks and captures the conductor material.

19. The method of claim 18, wherein the step of curing includes the step of:
placing the mold with the partially cured gelatinous beads in an oven; and
forming a solid green body from the mold in an oven.

20. The method of claim 18, wherein the step of burning out includes the step of:
placing the resultant green body with the sacrificial conductor network embedded inside in a furnace.

* * * * *